Patented May 6, 1952

2,595,808

UNITED STATES PATENT OFFICE 2,595,808

METHOD FOR USE IN THE PRESERVATION OF EGGS

Albert Napper, Woodlands, Southland, New Zealand

No Drawing. Application October 4, 1949, Serial No. 119,565. In New Zealand November 2, 1948

2 Claims. (Cl. 99—170)

This invention relates to an improved method of treating eggs for the purpose of preserving them for storage and keeping over long period of time under any of the usual conditions of storage as concerned with temperature and such like.

The said method comprises the subjection of the eggs to vacuum action to exhaust the air therefrom, and then for their sealing and the coating thereof with a film, which on drying, is of a nature which is odourless, tasteless, harmless and elastic, so that an effective hermetic sealing of the egg shells results. This ensures that the natural properties of the eggs to produce carbon dioxide within them are utilised to aid in their preservation by preventing the escape of the carbon dioxide, and also serves to prevent the loss of water by evaporation. The said treatment of the eggs, in addition, results in the destruction of any bacteria with which the surfaces of the shells may be infected.

This method is given effect to by subjecting the eggs, while contained and sealed in a suitable vessel and while immersed in an aqueous fluid of the particular nature hereinafter described, to the action of a vacuum produced within the vessel by withdrawing air from such vessel, and then suddenly admitting air to the vessel to cause the shells of the eggs to become impregnated with the said fluid and the substance in suspension in the fluid by the pressure of the air, to effect the sealing and coating of the shells.

The said sealing and coating fluid employed in respect of this method according to the present invention, consists of an aqueous fluid containing three to ten per cent of casein as calcium caseinate, and (or) sodium caseinate, rendered insoluble if so desired by the combining equivalent amount of formaldehyde; and precipitated calcium carbonate in suspension.

In the carrying out of the method, the eggs in suitable containers, as baskets, are placed in a sealed chamber capable of being brought under vacuum conditions and containing a supply of the said fluid such that the eggs are submerged therein. The space within the chamber is then evacuated to a suitable air pressure condition to withdraw the air from the eggs (a condition suitable for this purpose is that which is represented at 17° on a Bourden vacuum gauge) and as soon as such evacuation from the eggs is complete, the vacuum is broken suddenly by the admission of air to the chamber. This causes some of the precipitated calcium carbonate and some of the sealing fluid to be forced into the pores of the shells of the eggs to seal them and the shell surface to be coated with the fluid which forms a sealing film on drying. The eggs are then removed from the liquid and dried in the air at normal temperature or with the aid of forced draughts of warm air at 60° to 70° F. When dried, the eggs may be packed in boxes or crates and stored under normal temperature conditions.

What is claimed is:

1. A method of preserving eggs comprising subjecting the eggs, while submerged in a fluid, to the action of a vacuum to exhaust the air from the eggs and then subjecting the eggs to the action of air pressure to cause the shells of the eggs to be impregnated by the said fluid and their surfaces to be coated with a sealing film, the said impregnating and sealing fluid comprising an aqueous fluid containing from three to ten per cent of a caseinate selected from the group consisting of calcium caseinate and sodium caseinate and precipitated calcium carbonate in suspension.

2. A method of preserving eggs according to claim 1, in which the caseinate in the said fluid is rendered insoluble by combining therewith an equivalent amount of formaldehyde.

ALBERT NAPPER.

REFERENCES CITED

The following references are of record in the file of this patent:

UNITED STATES PATENTS

| Number | Name | Date |
|---|---|---|
| 2,060,926 | Chuck | Nov. 17, 1936 |
| 2,257,281 | Scholz | Sept. 30, 1941 |

FOREIGN PATENTS

| Number | Country | Date |
|---|---|---|
| 27,267 | Great Britain | Acc. Mar. 7, 1907 |
| 166,927 | Great Britain | Acc. July 20, 1921 |